UNITED STATES PATENT OFFICE.

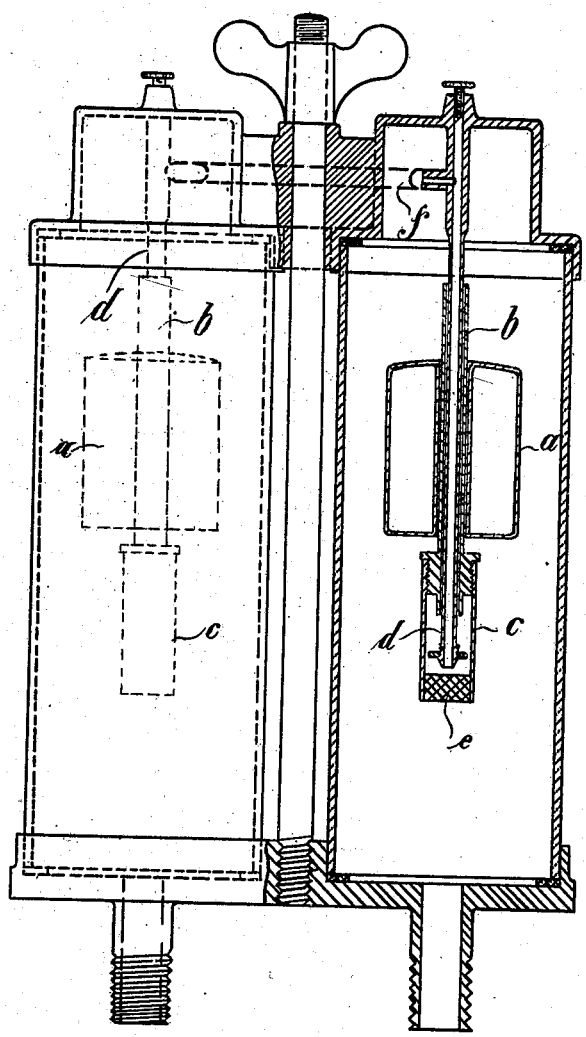

JOSEF MEYER, OF COLOGNE, GERMANY.

FLOAT-CONTROLLED DEVICE FOR MEASURING VESSELS, &c.

No. 899,884.  Specification of Letters Patent.  Patented Sept. 29, 1908.

Application filed June 21, 1907. Serial No. 380,111.

*To all whom it may concern:*

Be it known that I, JOSEF MEYER, a subject of the King of Prussia, German Emperor, residing at Cologne, in the Province of the Rhine, Kingdom of Prussia, German Empire, have invented a certain new and useful Float-Controlled Device for Measuring Vessels, &c., of which the following is a specification.

For the measuring vessels of automatic beverage vending apparatuses it is of great importance to assure the regular closure of the outlet of the vessel under all circumstances as soon as the requisite amount of liquid has been placed in the same. This closing of the measuring vessel is usually attained by preventing the escape of air from the vessel at the proper moment by means of a float.

In the constructions hitherto in use the air exit is at the top of the measuring vessel and is closed by means of a float. The closing material in this construction is usually outside the reach of the fluid and is generally only surrounded by air or carbonic acid; it therefore becomes dry and hard so that a thoroughly reliable closure and consequently an exact measuring of the amount of liquid is no longer assured. These drawbacks are avoided in the present invention by arranging the air closure at the lower part of the float, consequently within the reach of the liquid.

The invention is illustrated in the accompanying drawing in the usual construction of automatic beverage vending apparatuses, in which two measuring vessels are placed side by side and are operated alternately. On the right hand the device is shown in section, and on the left in elevation.

Each float *a* is made adjustable by friction upon a tube *b*, to the lower part whereof a box *c* is attached, which is raised together with the float on the rising of the level of the liquid. Within the tube *b* is placed a hollow spindle *d* firmly connected with the upper part of the casing, which spindle is open above and below, and enables the air driven out by the liquid to escape to the outside. In this case the air passes from above downwards between the tube *b* and the spindle *d*, passes from below into the latter, and flows through it into the open air.

The closing of the air exit takes place at the highest position of the float *a* because the rubber piece *e* blocks the lower opening of the hollow spindle *d* so that no more air can escape and consequently no more liquid can flow into the measuring vessel.

The upper openings of the spindle are connected the one to the other by means of the tube *f* for the purpose of causing the liquid which may rise too high in the vessel owing to want of tightness of the closing device or other disturbance of the apparatus to pass through the air exit of the apparatus, and so that a disturbance in the apparatus is made visible by the flowing out of the fluid at the exit orifice.

The rubber piece *e* placed at the lowermost part of the float, is always within the reach of the liquid so that it is kept moist and airtight.

As the float *a* proper is adjustable, the period of the stoppage of the air can be adjusted and in this manner any desired quantity of liquid can be measured by means of one and the same measuring vessel.

As material for the float, I prefer to use glass especially of assuring the needful cleanliness of the device, especially for beer supply apparatus.

Having now particularly described and ascertained the nature of my said invention and in what manner the same is to be performed, I declare that what I claim is:

1. Float controlled device for measuring vessels composed of a hollow spindle *d* rigidly suspended from the top of the measuring vessel being open at the bottom and being in communication with the atmosphere, of a tube *b* sliding on the spindle *d*, of a hollow float *a* secured on the tube *b*, of a cylinder *c* secured to the float below the same, of an elastic cushion *e* secured at the bottom end of the cylinder *c*, substantially as described.

2. Float controlled device for measuring vessels composed of a hollow spindle *d* rigidly suspended from the top of the measuring vessel being open at the bottom and being in communication with the atmosphere, of a tube *b* sliding on the spindle *d*, of a hollow float *a* frictionally secured on the tube *b*, of a cylinder *c* secured to the float below the same, of an elastic cushion *e* secured at the bottom end of the cylinder *c* substantially as described.

In testimony whereof I have signed my name to this specification in the presence of two subscribing witnesses.

JOSEF MEYER.

Witnesses:
BESSIE F. DUNLAP,
LOUIS VANDORY.